United States Patent
Seo et al.

(10) Patent No.: US 11,811,040 B2
(45) Date of Patent: Nov. 7, 2023

(54) BATTERY MODULE HAVING IMPROVED COOLING STRUCTURE

(71) Applicant: LG Chem, Ltd., Seoul (KR)

(72) Inventors: Sung-Won Seo, Daejeon (KR); Dal-Mo Kang, Daejeon (KR); Jeong-O Mun, Daejeon (KR); Yoon-Koo Lee, Daejeon (KR)

(73) Assignee: LG Energy Solution, Ltd.

( * ) Notice: Subject to any disclaimer, the term of this patent is extended or adjusted under 35 U.S.C. 154(b) by 165 days.

(21) Appl. No.: 16/767,457

(22) PCT Filed: Mar. 8, 2019

(86) PCT No.: PCT/KR2019/002747
§ 371 (c)(1),
(2) Date: May 27, 2020

(87) PCT Pub. No.: WO2019/235724
PCT Pub. Date: Dec. 12, 2019

(65) Prior Publication Data
US 2020/0395643 A1    Dec. 17, 2020

(30) Foreign Application Priority Data
Jun. 8, 2018 (KR) .......................... 10-2018-0066302

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC .......... H01M 10/6556; H01M 10/613; H01M 10/625; H01M 10/6568; H01M 10/6552
See application file for complete search history.

(56) References Cited

U.S. PATENT DOCUMENTS 6,068,946 A * 5/2000 Zedell, Jr. ............ H01M 50/119
429/96
6,465,123 B1 * 10/2002 Baumann ............ H01M 10/625
429/96
(Continued)

FOREIGN PATENT DOCUMENTS

DE 102015214185 A1    2/2017
DE 102015214185 B4 *  3/2017
(Continued)

OTHER PUBLICATIONS

DE102015214185B4 translation (Year: 2015).*
(Continued)

*Primary Examiner* — Ula C Ruddock
*Assistant Examiner* — Amanda Rosenbaum
(74) *Attorney, Agent, or Firm* — Lerner David LLP

(57) ABSTRACT

A battery module includes a module housing having a lower housing, a pair of side housings, front and rear housings, and an upper housing, for respectively covering a lower portion, both side portions, front and rear portions, and an upper portion of a cell stack. The lower housing includes a base plate configured to cover an entire lower surface of the cell stack and having a hole region forming a channel in at least one side of the base plate along a longitudinal direction; and a plurality of spacers disposed at predetermined intervals along the base plate and configured to support the cell stack apart from a surface of the base plate to form an empty space between the cell stack and the base plate. The hole region
(Continued)

communicates with the empty space so that a cooling medium can be supplied to the empty space.

17 Claims, 12 Drawing Sheets

(51) Int. Cl.
    *H01M 10/625*     (2014.01)
    *H01M 10/647*     (2014.01)
    *H01M 10/6568*     (2014.01)
    *H01M 50/211*     (2021.01)
    *H01M 10/6552*     (2014.01)
    *H01M 10/655*     (2014.01)
    *H01M 50/60*     (2021.01)

(52) U.S. Cl.
    CPC ..... *H01M 10/647* (2015.04); *H01M 10/6568* (2015.04); *H01M 50/211* (2021.01); *H01M 2220/20* (2013.01)

(56) References Cited

U.S. PATENT DOCUMENTS

| | | | |
|---|---|---|---|
| 2008/0220315 A1* | 9/2008 | Dougherty ........ | H01M 10/6566 429/82 |
| 2012/0270095 A1 | 10/2012 | Kim | |
| 2013/0034767 A1* | 2/2013 | Pentapati .......... | H01M 10/6556 165/104.33 |
| 2014/0234687 A1* | 8/2014 | Fuhr ................. | H01M 50/213 429/120 |
| 2014/0272508 A1* | 9/2014 | Musetti ............. | H01M 50/20 429/99 |
| 2015/0229010 A1 | 8/2015 | Ahn | |
| 2015/0236385 A1* | 8/2015 | Park ................. | H01M 10/6554 429/120 |
| 2017/0104252 A1* | 4/2017 | Wünsche ............ | H01M 10/613 |
| 2017/0191567 A1 | 7/2017 | Na et al. | |
| 2017/0365888 A1* | 12/2017 | Kwon ................. | H01M 50/291 |
| 2018/0048039 A1* | 2/2018 | Newman ............ | H01M 10/625 |
| 2018/0062229 A1* | 3/2018 | Jeong ................ | H01M 50/204 |
| 2018/0138565 A1 | 5/2018 | Lee et al. | |
| 2018/0205124 A1 | 7/2018 | Lee et al. | |
| 2019/0260102 A1* | 8/2019 | Schmiedhofer ..... | H01M 10/647 |
| 2019/0334217 A1 | 10/2019 | Yoon et al. | |
| 2020/0350612 A1* | 11/2020 | Xu ..................... | H01M 50/242 |

FOREIGN PATENT DOCUMENTS

| | | | |
|---|---|---|---|
| JP | 2014-220089 A | | 11/2014 |
| JP | 2015106527 A | | 6/2015 |
| KR | 101252935 B1 | | 4/2013 |
| KR | 20130080144 A | | 7/2013 |
| KR | 20150000378 A | | 1/2015 |
| KR | 20150094030 A | | 8/2015 |
| KR | 20160048564 A | * | 5/2016 |
| KR | 20160048564 A | | 5/2016 |
| KR | 101745239 B1 | | 6/2017 |
| KR | 20170107792 A | | 9/2017 |
| KR | 20170132514 A | | 12/2017 |
| KR | 20170142445 A | | 12/2017 |
| KR | 20180034958 A | | 4/2018 |
| KR | 20180045840 A | | 5/2018 |

OTHER PUBLICATIONS

International Search Report for Application No. PCT/KR2019/002747 dated Jun. 28, 2019, 2 pages.
Extended European Search Report for EP Patent Application No. 19814466.9, dated Feb. 16, 2021, 7 pages.
Search Report dated Jan. 28, 2023 from Office Action for Chinese Application No. 201980005785.2 dated Feb. 2, 2023. 2 pgs. (see p. 1, categorizing the cited references).

* cited by examiner (a)

(b)

(a)

(b)

(a)

(b)

(a)

(b)

BATTERY MODULE HAVING IMPROVED COOLING STRUCTURE

CROSS-REFERENCE TO RELATED APPLICATIONS

The present application is a national phase entry under 35 U.S.C. § 371 of International Application No. PCT/KR2019/002747 filed Mar. 8, 2019, which claims priority to Korean Patent Application No. 10-2018-0066302 filed on Jun. 8, 2018, the disclosures of which are incorporated herein by reference.

TECHNICAL FIELD

The present disclosure relates to a battery module with an improved cooling structure, and more particularly, to a battery module with an improved cooling efficiency, which uses an insulating oil for cooling and has a cooling structure for allowing the insulating oil to directly contact battery cells.

BACKGROUND ART

Secondary batteries commercially used at present include nickel-cadmium batteries, nickel-hydrogen batteries, nickel-zinc batteries, and lithium secondary batteries. Among them, the lithium secondary batteries are highly notable due to substantially no memory effect to ensure free charging and discharging, very low self-discharge rate and high energy density, compared to nickel-based secondary batteries.

The lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate coated with a positive electrode active material and a negative electrode active material are disposed with a separator being interposed therebetween, and an exterior, namely a battery case, for hermetically accommodating the electrode assembly along with an electrolyte.

Generally, the lithium secondary battery may be classified into a can-type secondary battery in which the electrode assembly is included in a metal can and a pouch-type secondary battery in which the electrode assembly is included in a pouch made of aluminum laminate sheets, depending on the shape of the exterior.

Recently, secondary batteries have been widely used not only in small-sized devices such as portable electronic devices but also in medium-sized or large-sized devices such as vehicles and power storage systems. When used in the medium-sized or large-sized devices, a large number of secondary batteries are electrically connected to increase capacity and power. In particular, pouch-type cells are widely used for the medium-sized or large-sized devices because of they may be easily stacked.

However, the pouch-type cell is generally packaged in the battery case made of a laminate sheet of aluminum and polymer resin, and thus its mechanical stiffness is not large. Thus, when the battery module including a plurality of pouch-type cells is configured, a frame is often used to protect the secondary batteries from external impact, prevent shaking thereof, and facilitate stacking thereof.

The frame may be called by different names, such as a cartridge. In many cases, the frame has a rectangular shape having an empty center portion, and at this time, four sides of the frame surround the outer circumference of the pouch-type cell. In addition, a plurality of frames are stacked to configure the battery module, and the pouch-type cells may be placed in the empty space inside the frame when the frames are stacked.

Meanwhile, referring to FIG. 1, a conventional battery module structure is shown. If a plurality of pouch-type cells 1 are stacked by using a plurality of frames 2, in the conventional battery module structure, plate-shaped cooling fins 3 are applied on the outer surfaces of each of the pair of pouch-type cells 1, thereby increasing the cooling efficiency.

The secondary battery may be used in high temperature environments such as summer, and the secondary battery may also generate heat from itself. At such time, if a plurality of secondary batteries are stacked on each other, the temperature of the secondary batteries may become higher. If the temperature is higher than a proper temperature, the performance of the secondary batteries may deteriorate, and in severe cases, explosion or ignition may occur. Thus, when the battery module is configured, the cooling fins 3 are applied to contact the surface of the pouch-type cell 1, and the cooling fins 3 are brought into contact with a cooling plate 4 located therebelow to prevent the overall temperature of the battery module from rising. This configuration is used frequently.

However, if the cooling fin 3 usually made of a metal material is interposed between the pouch-type cells 1 facing each other to configure the battery module, the contact heat resistance is inevitably very large due to the difference in material between the cooling fin 3 and the surface of the pouch-type cell 1. Also, only with the cooling method that depends on the conductivity of the metal, sufficient cooling is achieved in a situation where a large amount of heat is generated.

Thus, there is an urgent need to develop a battery module structure using a cooling method capable of reducing contact thermal resistance and allowing heat to be emitted more efficiently, compared to a simple thermal conduction method.

DISCLOSURE

Technical Problem

The present disclosure is designed to solve the problems of the related art, and therefore the present disclosure is directed to providing a battery module, which adopts a cooling structure capable of allowing direct contact between a cooling medium and battery cells so that the battery module may be efficiently cooled even when the amount of heat increases by applying a battery module with a high capacity and/or a high output.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack formed by stacking a plurality of battery cells; and a module housing configured to accommodate the cell stack and having a lower housing, a pair of side housings, a pair of front and rear housings and an upper housing for respectively covering a lower portion, both side portions, front and rear portions and an upper portion of the cell stack, wherein the lower housing includes: a base plate having a hole region forming a channel in at least one side thereof along a longitudinal direction and configured to cover an entire lower surface of the cell stack; and a plurality of spacers disposed in the base plate at predetermined intervals and configured to support the cell stack to be spaced apart from a surface of the base plate so that an empty space is formed between the cell stack and the base plate, wherein the hole region communicates with the empty space so that a cooling medium is supplied to the empty space.

The plurality of spacers may include a first spacer and a second spacer respectively provided at one side and the other side of the base plate in the longitudinal direction, and the first spacer and the second spacer may be formed to extend along a width direction of the base plate so that both ends thereof are in contact with both sides of the base plate.

The plurality of spacers may further include at least one third spacer spaced apart from the first spacer and the second spacer and provided between the first spacer and the second spacer.

The at least one side of the base plate may be defined as a first side and a second side, which correspond to both sides of the base plate opposite to each other, and the hole region may include a first region formed in the first side to communicate from an outside of the base plate to a first empty space positioned between the first spacer and the third spacer; a second region formed in the second side to communicate from the first empty space to a second empty space positioned between the third spacer and the second spacer; and a third region formed in the first side to communicate from the second empty space to the outside of the base plate.

The third spacer may have a third spacer channel formed therethrough so that the cooling medium passes through the third spacer.

The first spacer and the second spacer may respectively have a first spacer channel and a second spacer channel formed therethrough, and the battery module may further comprise a first cooling pipe configured to connect the hole region and the first spacer channel; and a second cooling pipe configured to connect the hole region and the second spacer channel.

The at least one side of the base plate may be defined as a first side and a second side, which correspond to both sides of the base plate opposite to each other, and the first and second sides may be formed higher than other portions of the base plate and further have a coupling groove provided to engage with a coupling protrusion formed at a lower end of the side housing to protrude downward.

The first and second sides may further have a leakage prevention protrusion protruding to extend toward the cell stack and come into contact with an outermost cell of the cell stack.

An adhesive may be interposed between the cell stack and the spacer so that the cooling medium is not leaked between the cell stack and the spacer.

The battery module may further comprise a supply tube and a discharge tube respectively connected to one side and the other side of the hole region of the base plate so that the cooling medium flows into or out of the empty space.

In another aspect of the present disclosure, there is also provided a battery pack, which is implemented by connecting a plurality of battery modules described above.

In another aspect of the present disclosure, there is also provided a vehicle, comprising the battery pack.

Advantageous Effects

According to an embodiment of the present disclosure, since a battery module with a cooling structure capable of direct contact between a cooling medium and battery cells is provided, the battery module may be efficiently cooled even when the amount of heat increases by applying a battery module with a high capacity and/or a high output, thereby improving the performance of the battery module. Moreover, it is possible to prevent safety accidents such as ignition and explosion of the battery cells due to the temperature rise.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

First, components of a battery module according to an embodiment of the present disclosure will be described briefly with reference to FIGS. 2 and 3.

Figure 1:
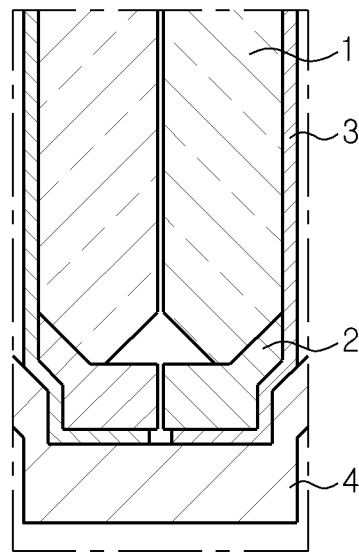
FIG. 1 is a diagram showing a cooling structure applied to a conventional battery module.
Figure 2:
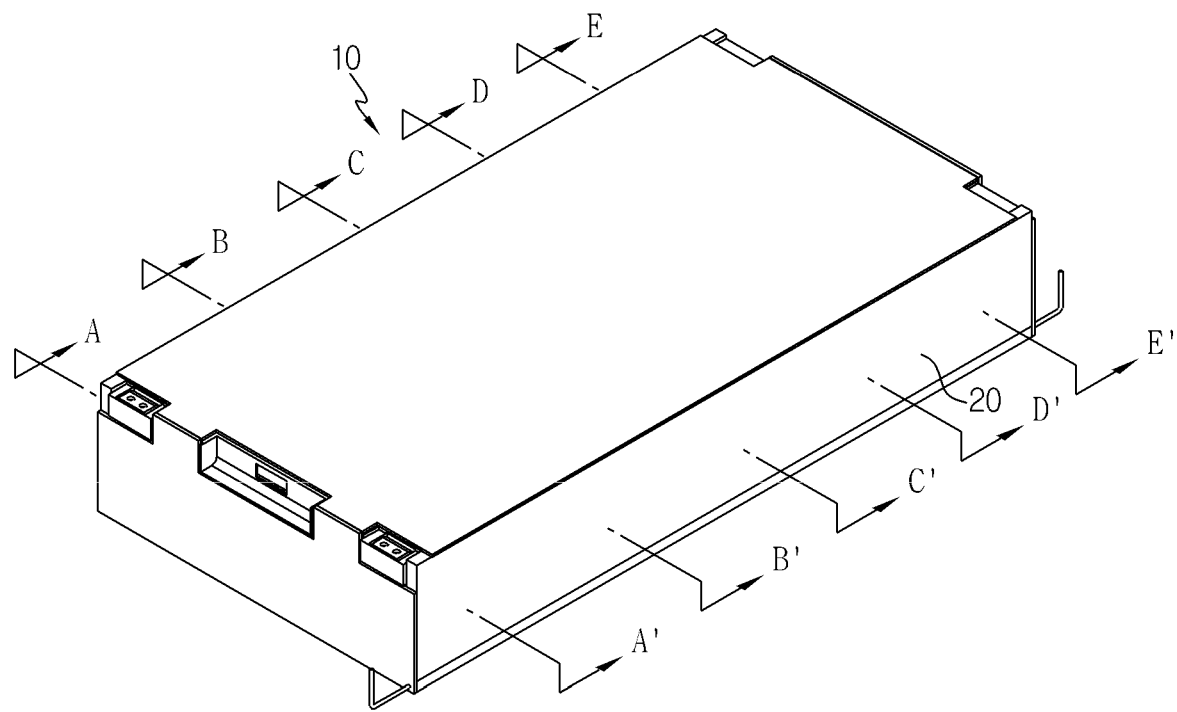
FIG. 2 is a perspective view showing an appearance of a battery module according to an embodiment of the present disclosure.
Figure 3:
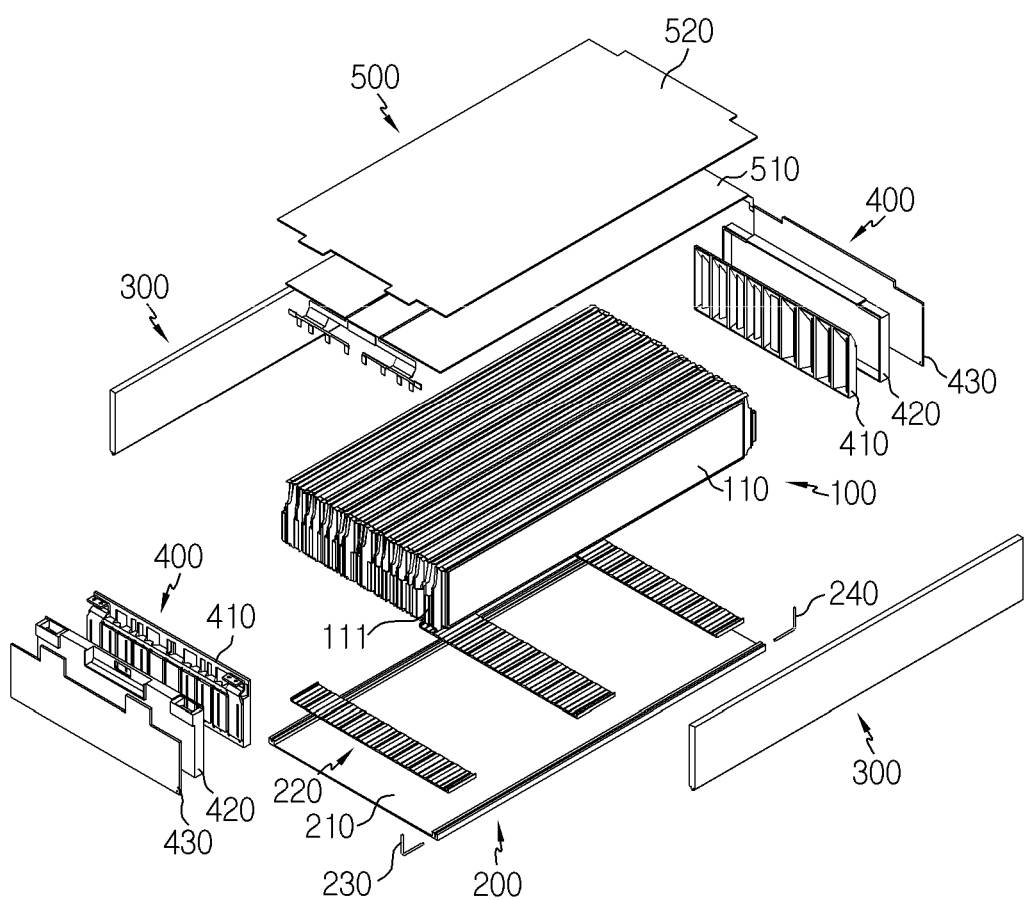
FIG. 3 is an exploded perspective view showing the battery module according to an embodiment of the present disclosure.

FIG. 2 is a perspective view showing an appearance of a battery module according to an embodiment of the present disclosure, and FIG. 3 is an exploded perspective view showing the battery module according to an embodiment of the present disclosure.

Referring to FIGS. 2 and 3, a battery module 10 according to an embodiment of the present disclosure includes a cell stack 100 and a module housing 20 for accommodating the cell stack 100. Also, the module housing 20 includes a lower housing 200, a pair of side housings 300, a pair of front and rear housings 400, and an upper housing 500.

The cell stack 100 is prepared by stacking a plurality of battery cells 110. The battery cell 110 used herein is not particularly limited as long as it is a secondary battery capable of charging and discharging. For example, the battery cell 110 may be a pouch-type battery cell 110.

Each of the battery cells 110 may have a pair of electrode leads 111 extending to one side and the other side. The electrode leads 111 include a positive electrode lead and a negative electrode lead. As explained later, the stacked battery cells 110 may be firmly fixed and sealed by an adhesive or the like so that a cooling medium such as an insulating oil, which is in contact with a lower portion of the cell stack 100, is not able to penetrate through the space between the battery cells 110 of the cell stack 100.

In addition, the electrode leads 111 may be arranged or connected such that the battery cells 110 of the cell stack 100 are connected in series, in parallel, or both in series and in parallel.

The lower housing 200 includes a base plate 210 configured to cover an entire lower surface of the cell stack 100 and has a hole region 213 that forms a channel as a hollow structure in at least one side along the longitudinal direction, and a plurality of spacers 220 for forming an empty space S1, S2 between the cell stack 100 and the base plate 210 by supporting the cell stack 100 to be spaced apart from the surface of the base plate 210.

Here, the empty space S1, S2 means a sealed space surrounded by the cell stack 100, the spacer 220 and the base plate 210. The empty space S1, S2 communicates with the hole region 213 so that a cooling medium is supplied into the empty space.

Figure 4:
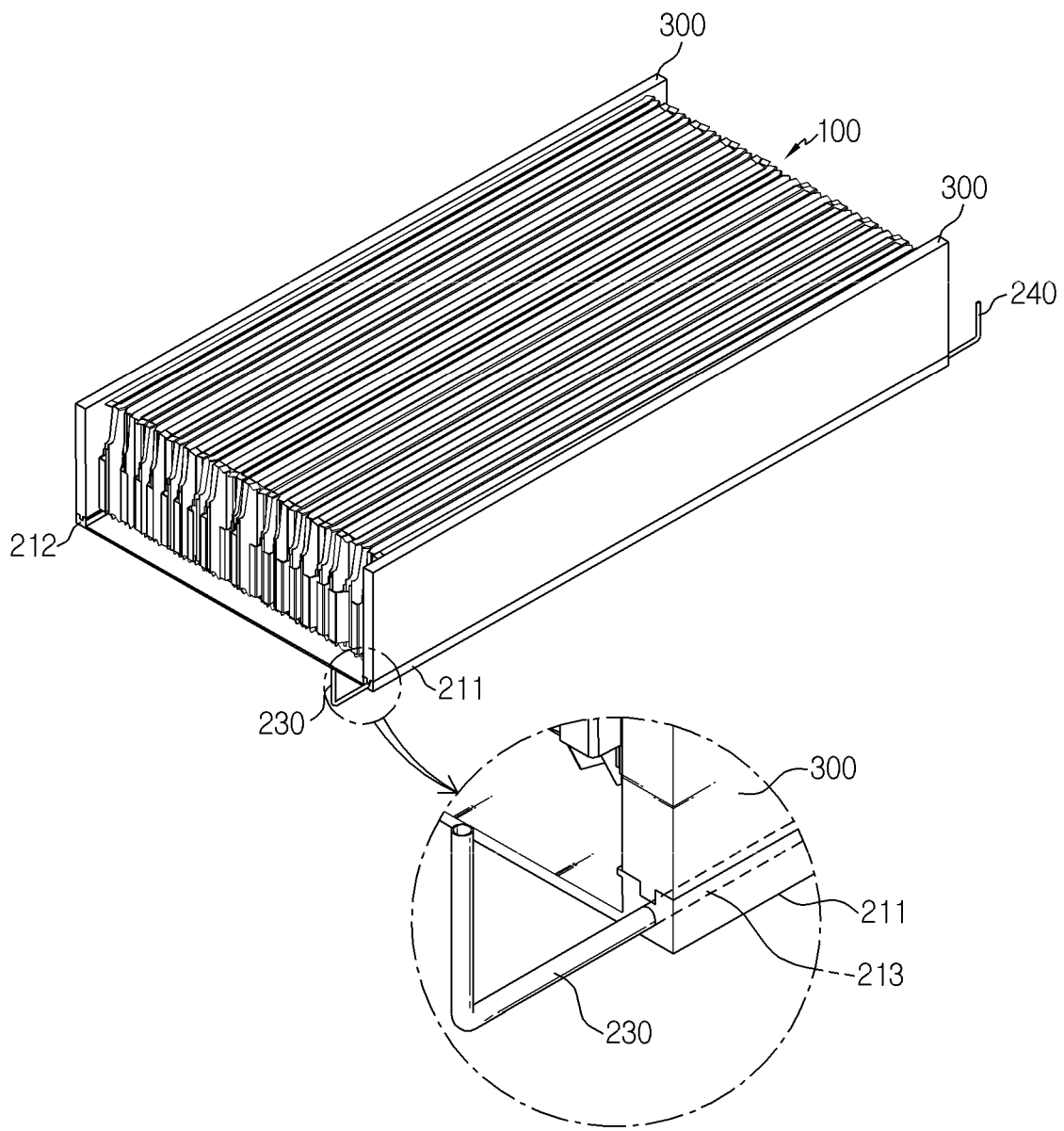
FIG. 4 is a perspective view showing a cell stack, a lower housing and a side housing, employed at the battery module according to an embodiment of the present disclosure.

The cooling medium may be supplied into and out of the battery module 10 by connecting a supply tube 230 and a discharge tube 240 to an inlet and an outlet of the hole region 213, respectively. For example, as shown in FIG. 4, the supply tube 230 may be connected to the inlet of the hole region 213 of the base plate 210 from the front of the battery module 10, and the discharge tube 240 may be connected to the outlet of the hole region 213 from the rear of the battery module 10. The flow of the cooling medium inside the battery module 10 will be explained later in detail.

The pair of side housings 300 respectively cover both sides of the cell stack 100 and face wide surfaces of the battery cells 110 disposed on outermost sides among the battery cells 110 of the cell stack 100. The pair of side housings 300 may press the cell stack 100 at both sides thereof to prevent a gap from being created between the battery cells 110 of the cell stack 100.

The pair of front and rear housings 400 may include a bus bar frame 410, an insulation cover 420, and front and rear covers 430, respectively.

The bus bar frame 410 is coupled to the cell stack 100 from the front or rear portion of the cell stack 100. The electrode leads 111 are inserted into the bus bar frame 410 to facilitate the work of bending the electrode lead 111 for electrical connection between the battery cells 110. That is, the electrode leads 111 are inserted through insert slits formed in the bus bar frame 410 and then bent so that the adjacent electrode leads 111 are coupled to each other by welding or the like.

The insulation cover 420 is a component provided to prevent the electrode leads 111, which are coupled to each other by being inserted into the bus bar frame 410 and bent but should not be in contact with each other, from contacting each other. The insulation cover 420 is coupled onto the bus bar frame 410 to prevent a short caused by an external factor.

The front and rear covers 430 are components coupled onto the insulation cover 420 and serve to protect internal components such as the cell stack 100, the bus bar frame 410, and the insulation cover 420.

The upper housing 500 may include a sensor assembly 510 disposed at an upper portion of the cell stack 100 and electrically connected to the electrode leads 111 inserted and bent through the bus bar frame 410, and a top plate 520 coupled to an upper portion of the sensor assembly 510 to form an outermost layer of the upper housing 500.

Subsequently, referring to FIGS. 4 to 11 along with FIGS. 2 and 3, the cooling structure of the battery module 10 according to an embodiment of the present disclosure will be described in more detail.

Figure 5:
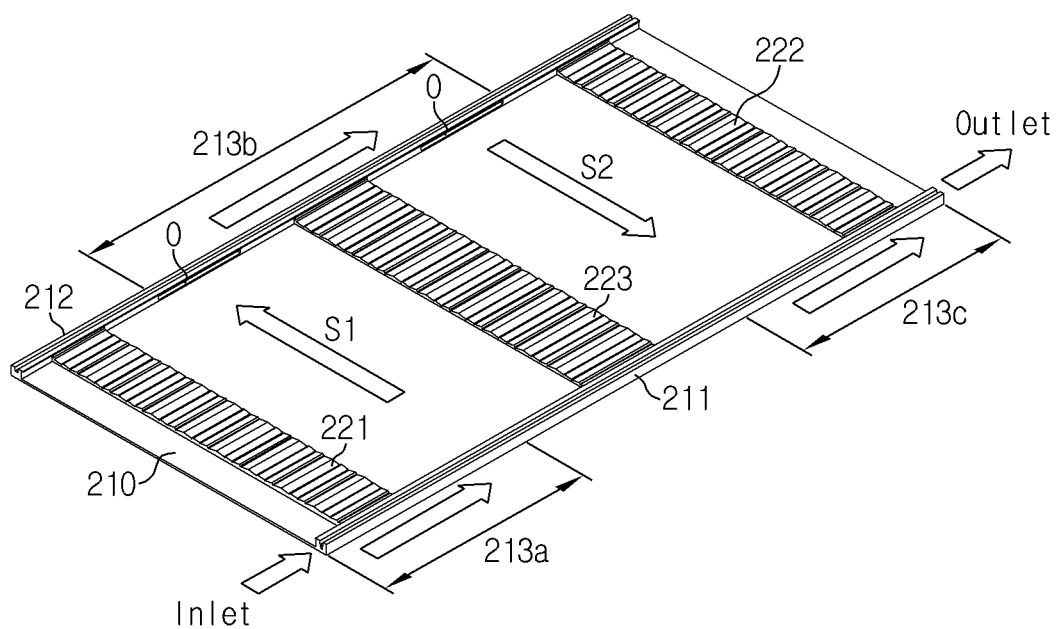
FIG. 5 is a diagram showing a structure of the lower housing that guides the flow of a cooling medium according to an embodiment of the present disclosure.

Hereinafter, portions of the base plate 210 corresponding to both sides opposite to each other along the longitudinal direction as shown in FIGS. 4 and 5 will be defined as a first side 211 and a second side 212.

The first side 211 and the second side 212 may be formed higher than other portions (plate surfaces) of the base plate 210. The lower surface of the cell stack 100 is supported by the spacers 220 between the first side 211 and the second side 212 so as to be spaced apart from the surface of the base plate 210, and both sides of the cell stack 100 are supported by the side housings 300.

Figure 6:
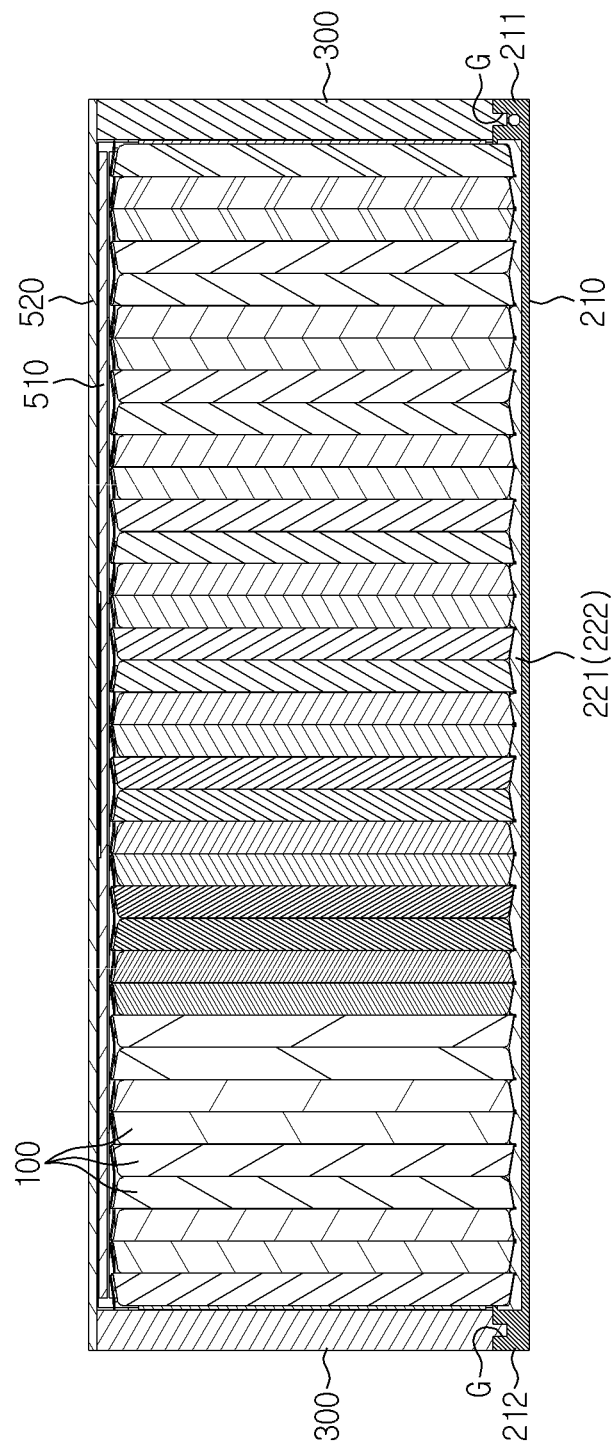
FIG. 6 is a cross-sectional view, taken along the lines A-A' and E-E' of FIG. 2.
Figure 7:
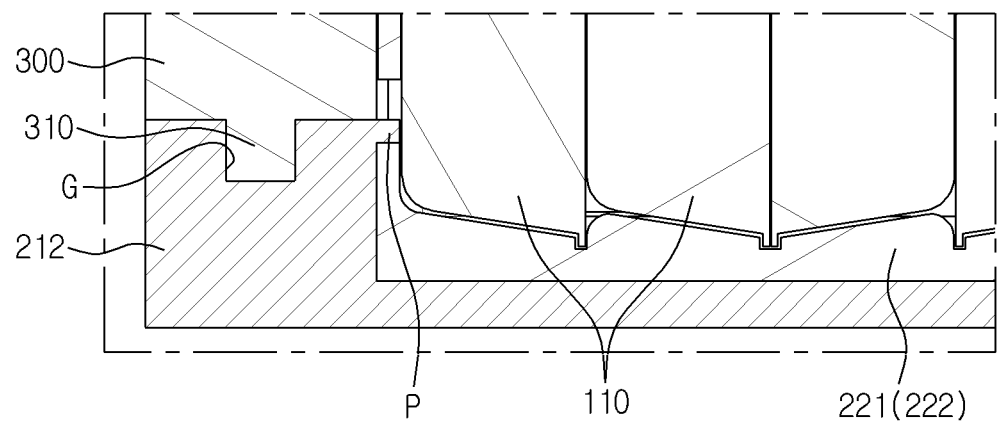
FIG. 7 is enlarged views showing both sides of the base plate of FIG. 6.
Figure 7:
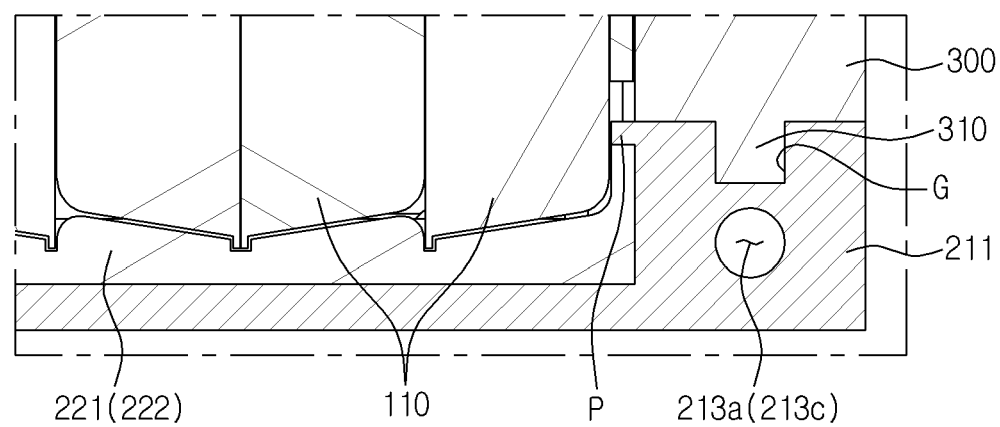
Figure 8:
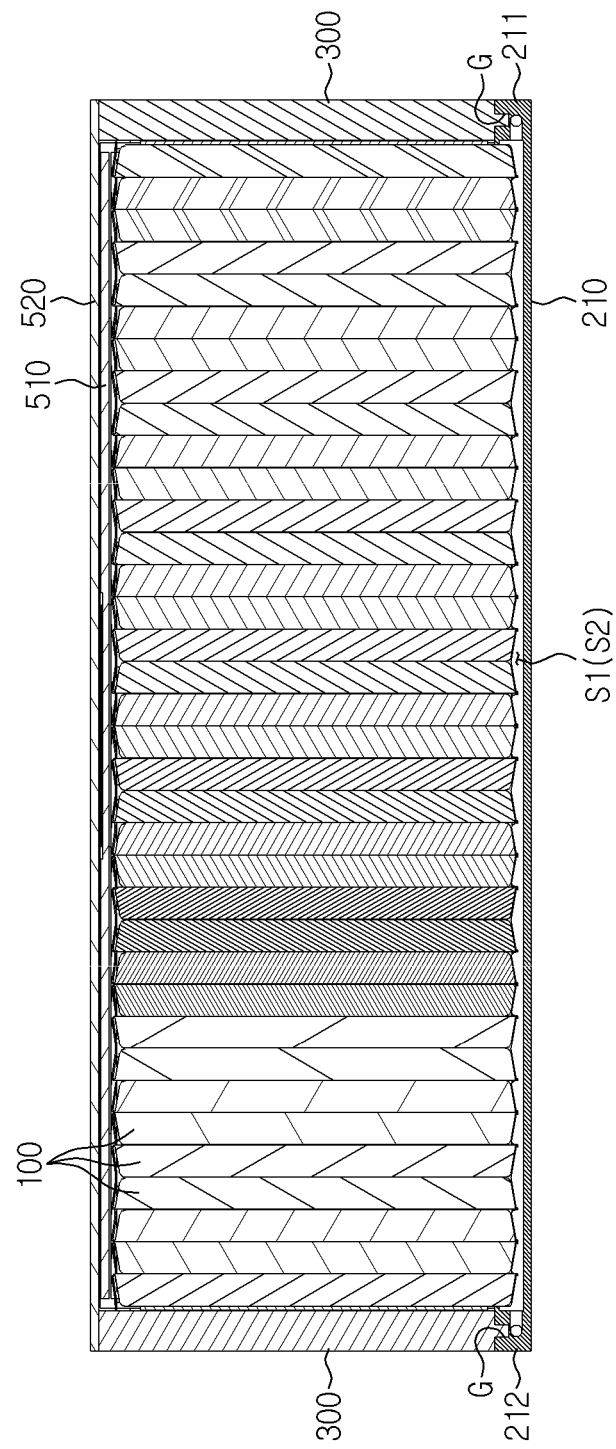
FIG. 8 is a cross-sectional view, taken along the lines B-B' and D-D' of FIG. 2.
Figure 9:
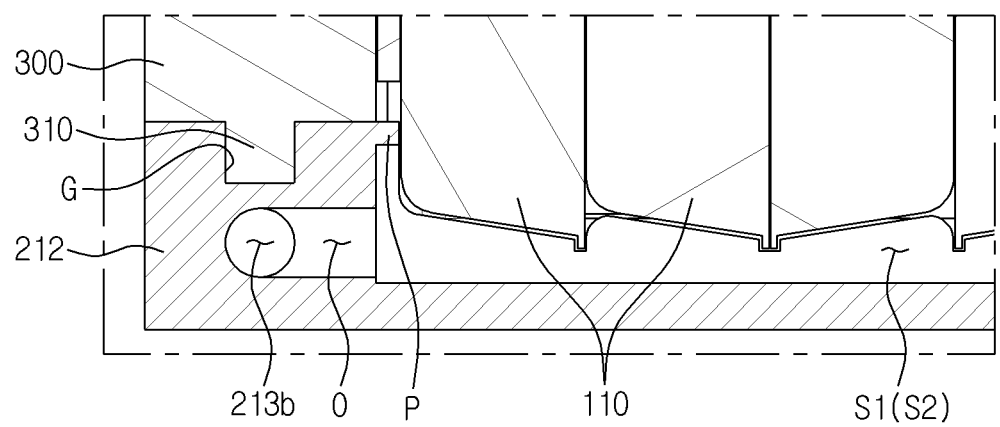
FIG. 9 is enlarged views showing both sides of the base plate of FIG. 8.
Figure 9:
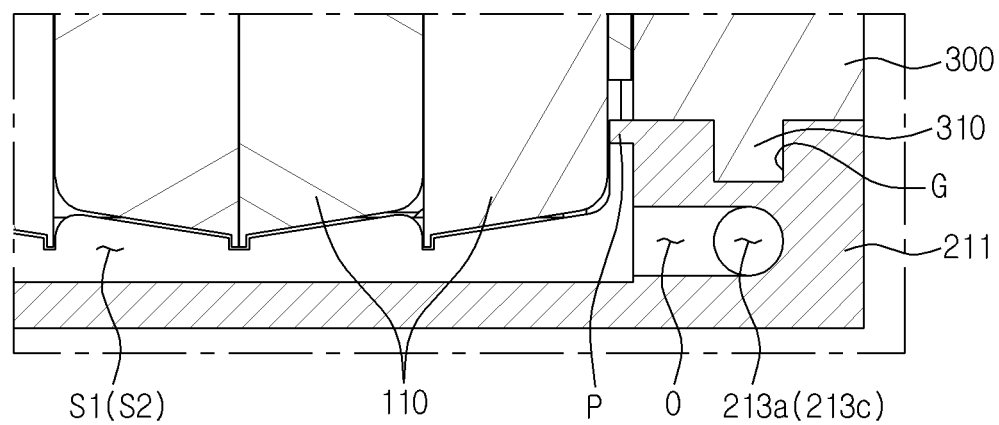
Figure 10:
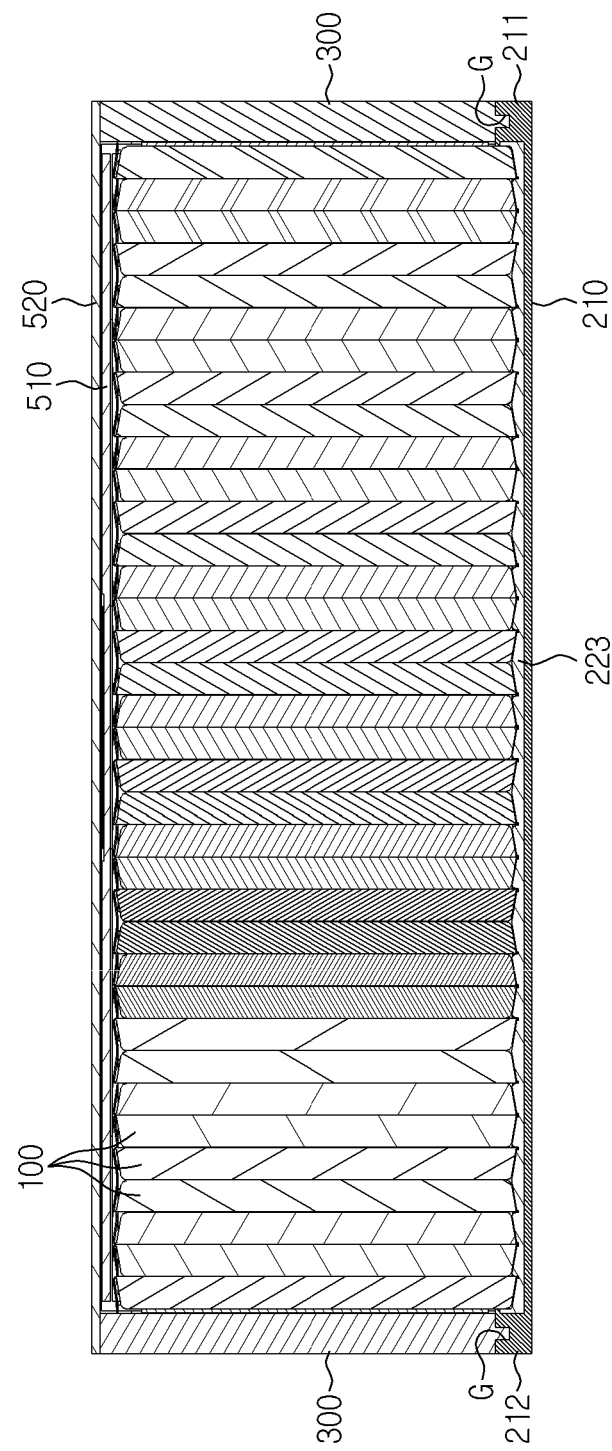
FIG. 10 is a cross-sectional view, taken along the line C-C' of FIG. 2.
Figure 11:
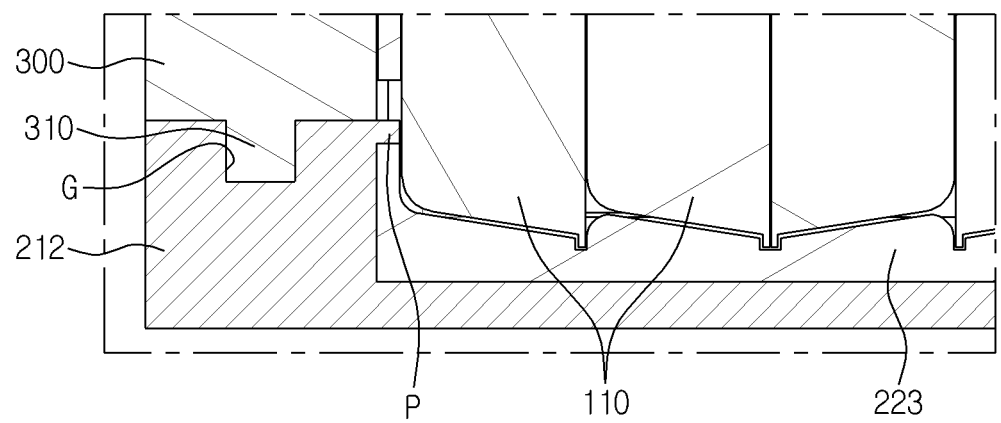
FIG. 11 is enlarged views showing both sides of the base plate of FIG. 10.
Figure 11:
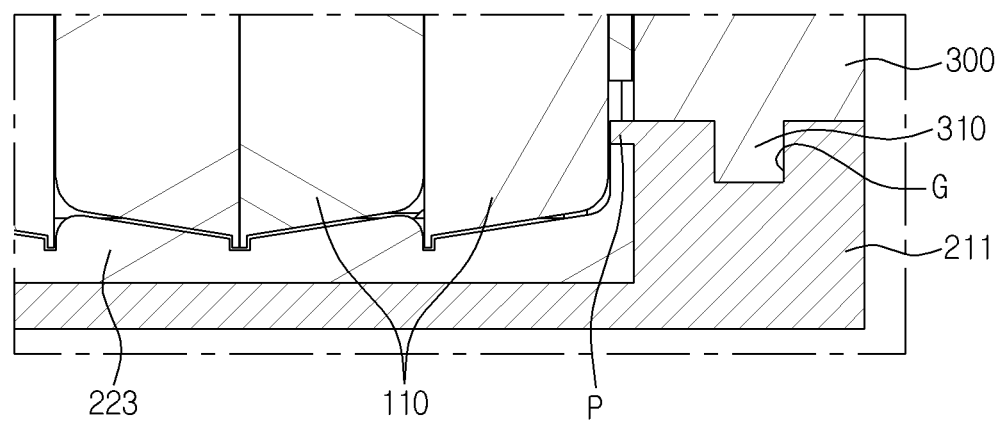

Referring to FIGS. 6 and 7, the side housing 300 according to this embodiment has a coupling protrusion 310 formed at a lower end thereof to protrude downward. In addition, the first side 211 and the second side 212 of the base plate 210 respectively have a coupling groove G provided to engage with the coupling protrusion 310. The coupling protrusion 310 is inserted and fixed in the coupling groove G so that the side housing 300 may be fixed to the first side 211 and the second side 212 of the base plate 210. Here, unlike this embodiment, the coupling protrusion 310 may be provided to the first and second sides 212, and the coupling groove G may be provided to the side housing 300, so that the coupling protrusion 310 and the coupling groove G are fixed.

The first and second sides 211, 212, for example, may serve as fences for holding the cooling medium in the empty space S1, S2, and may further include a leakage prevention protrusion P at a place in contact with the cell stack 100. As shown in FIG. 7, the leakage prevention protrusion P may be provided to extend horizontally toward the cell stack 100 so as to come into contact with an outermost cell of the cell stack 100. The leakage prevention protrusion P may prevent a gap from being formed between the base plate 210 and the cell stack 100, and thus resulting in the leakage of the cooling medium. Preferably, an adhesive may be further interposed along the leakage prevention protrusion P.

Also, the spacers 220 may be fabricated to correspond to the shape of the lower surface of the cell stack 100. Considering that the lower surface of the cell stack 100 including the pouch-type battery cells 110 does not have a flat lower surface due to the nature of the pouch-type battery cells 110, the upper surface of the unit spacers 220 may be formed to conform to the shape of the lower surface of the cell stack 100 to eliminate the gap between the unit spacers 220 and the lower surface of the cell stack 100.

In addition, an adhesive is interposed between the cell stack 100 and the spacer 220 so that the cooling medium such as an insulating oil is not leaked between the cell stack 100 and the spacer 220. The adhesive not only couples and fixes the cell stack 100 and the spacer 220 to each other but also functions as a gasket.

Meanwhile, the spacer 220 may be formed with a plurality of unit spacers 220 spaced apart from each other. For example, as shown in FIG. 5, the spacer 220 may include a first spacer 221 provided at one end of the base plate 210 in a longitudinal direction, a second spacer 222 provided at the other end of the base plate 210 in the longitudinal direction, and a third spacer 223 spaced apart from the first spacer 221 and the second spacer 222 and provided between the first spacer 221 and the second spacer 222.

However, even though three unit spacers 220 are depicted in the figures, the number of unit spacers is not limited thereto, and two or more units may be provided. That is, the third spacer 223 may be omitted, and one or more unit spacers 220 such as the third spacer 223 spaced apart from each other may be provided between the first spacer 221 and the second spacer 222. However, hereinafter, for convenience of explanation, it will be described that three unit spacers 220 are provided.

The unit spacers 220 extend along the width direction of the base plate 210, and both ends of the unit spacers 220 are disposed in contact with both sides of the base plate 210, namely in contact with the first side 211 and the second side 212. The cell stack 100 is placed on the unit spacers 220 so that its lower surface is not in contact with the surface of the base plate 210. Accordingly, a predetermined empty space S1, S2 is formed between the cell stack 100 and the base plate 210.

Referring to FIGS. 4 to 11, it may be found that the upper and lower sides of the empty space S1, S2 are blocked by the cell stack 100 and the base plate 210, the front and rear sides of the empty space S1, S2 are blocked by the first spacer 221 and the second spacer 222, and the left and right sides of the empty space S1, S2 are blocked by the first side 211 and the second side 212, respectively. In addition, the empty space S1, S2 may be partitioned by the third spacer 223 into a first empty space S1 and a second empty space S2. The third spacer 223 is a component for providing a stable supporting force to the cell stack 100 and may be added or omitted according to the size of the battery cell 110.

The first side 211 and/or the second side 212 of the base plate 210 are utilized as a cooling medium moving path for supplying the cooling medium to the empty space S1, S2. As described above, the first side 211 and the second side 212 respectively have a channel formed therein along the longitudinal direction of the base plate 210 and have the hole regions 213 communicating with the empty space S1, S2. In addition, the hole region 213 has an opening O at every predefined location that communicates with the empty space S1, S2 so that the cooling medium may penetrate into the empty space S1, S2 through the opening O.

As shown in FIG. 5, the hole region 213 according to this embodiment includes a first region 213a and a third region 213c formed in the first side 211 and a second region 213b formed in the second side 212.

The first region 213a is a channel region extending from the inlet of the hole region 213 to the first empty space S1 positioned between the first spacer 221 and the third spacer 223. The cooling medium flowing from the outside through the supply tube 230 moves along the first region 213a and permeates into the first empty space S1 through the opening of the first region 213a.

The second region 213b is a channel region extending from the first empty space S1 to the second empty space S2 positioned between the third spacer 223 and the second spacer 222. Two openings O are formed in the second region to face the first empty space S1 and the second empty space S2, respectively. The second region 213b may be a channel region for moving the cooling medium of the first empty space S1 to the second empty space S2 by bypassing the third spacer 223.

The third region 213c is a channel region extending from the second empty space S2 to the outlet of the hole region 213. The cooling medium of the second empty space S2 moves along the third region 213c and is discharged to the outside through the discharge tube 240.

That is, if the flow of the cooling medium is summarized, the cooling medium moves in the order of the supply tube 230, the first region 213a, the first empty space S1, the second region 213b, the second empty space S2, the third region 213c, and the discharge tube 240. The battery module 10 according to an embodiment of the present disclosure having the cooling medium flow described above may have higher cooling performance compared to existing techniques since the cooling medium directly contacts the battery cells 110.

Meanwhile, in this embodiment, three hole regions 213 are provided, depending on the number of the unit spacers 220 and the empty spaces S1, S2. However, the number of hole regions 213 may be changed as desired depending on the number of unit spacers 220 and empty spaces S1, S2. In addition, the inlet or the outlet of the hole region 213 may be connected to a connection tube (not shown) for connecting two battery modules 10 instead of the supply tube 230 or the discharge tube 240. For example, if a plurality of battery modules 10 are connected to form a battery pack (not shown), the outlet of the hole region 213 of any one battery module 10 may be connected to the inlet of the hole region 213 of another battery module 10 by means of the connection tube.

Figure 12:
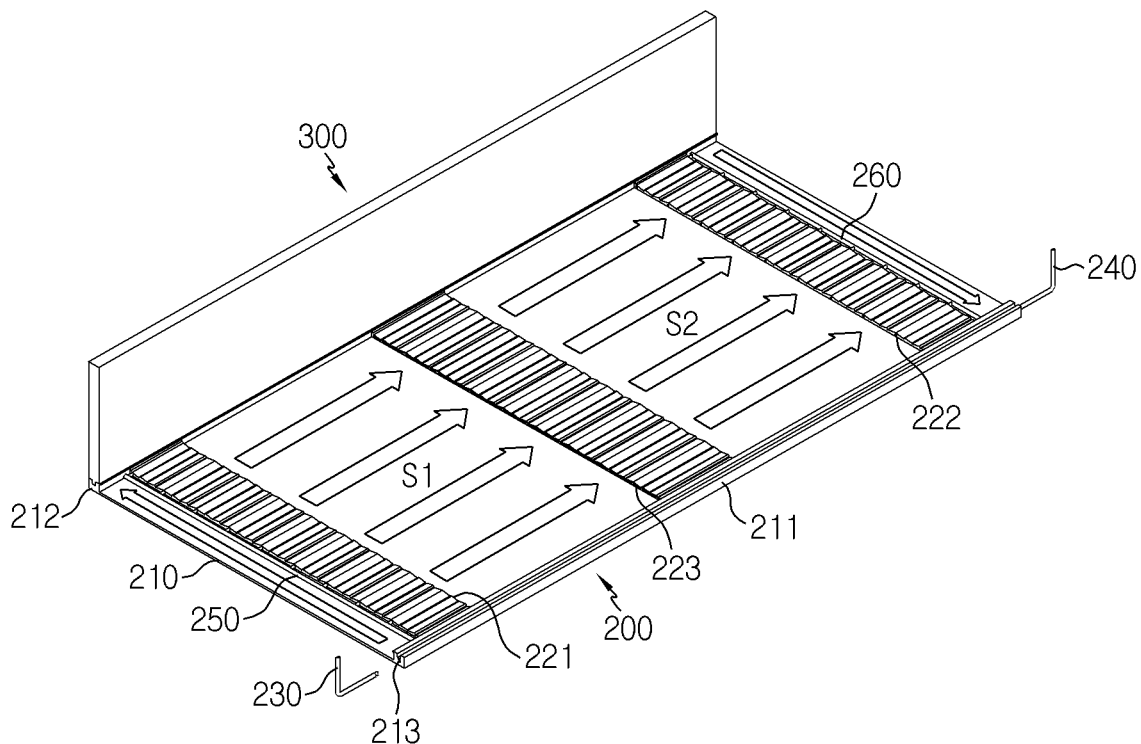
FIG. 12 is a diagram corresponding to FIG. 5, which shows a structure of a lower housing that guides the flow of a cooling medium according to another embodiment of the present disclosure.
Figure 13:
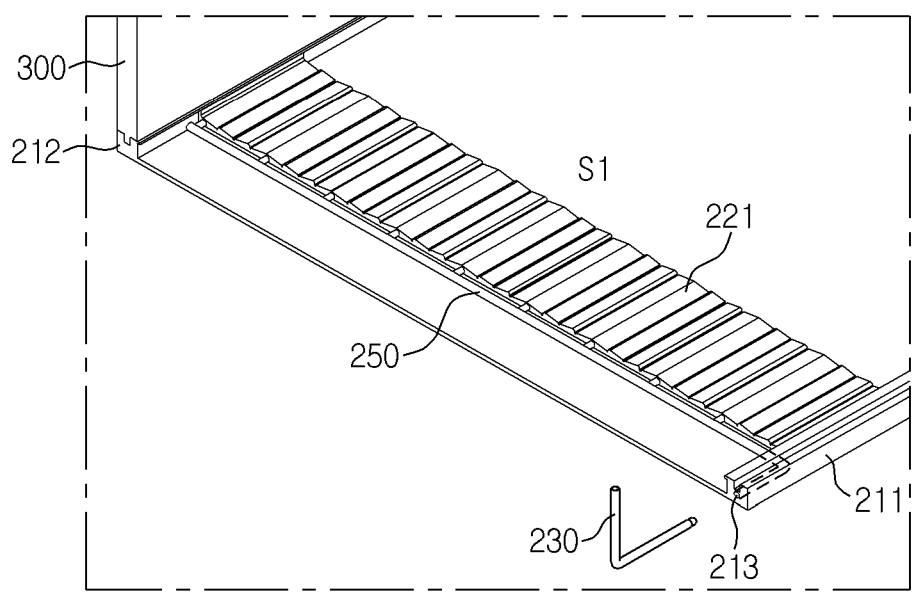
FIG. 13 is an enlarged view showing a main part of FIG. 12.
Figure 14:
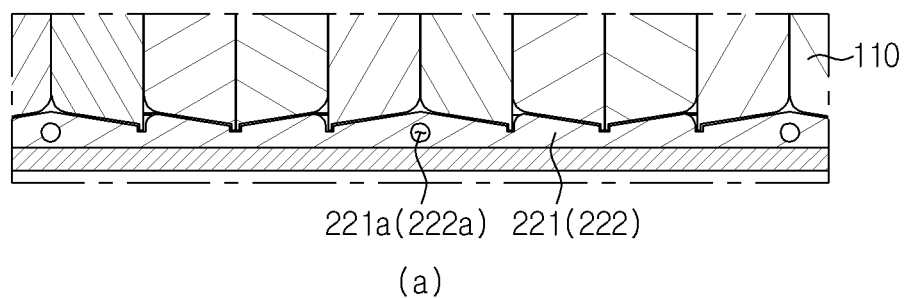
FIG. 14 is a cross-sectional view showing a portion of first to third spacers according to another embodiment of the present disclosure.
Figure 14:
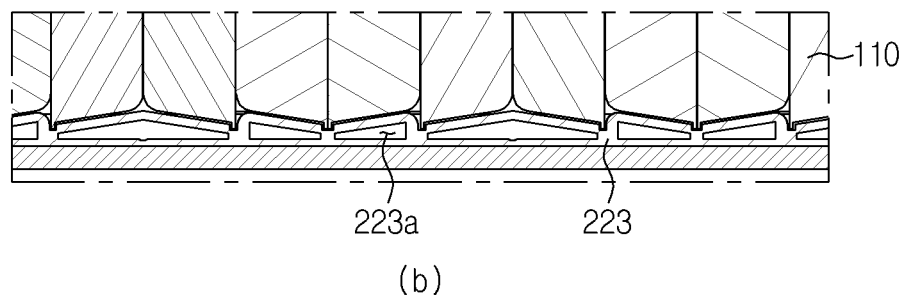

Subsequently, referring to FIGS. 12 to 14, the cooling channel of the battery module 10 according to another embodiment of the present disclosure will be described.

The battery module 10 according to another embodiment of the present disclosure will be described mainly based on features different from the former embodiment, and features similar or identical to the former embodiment will not be described in detail again.

The first spacer 221, the second spacer 222 and the third spacer 223 according to another embodiment of the present disclosure respectively have channels formed therethrough so that the cooling medium passes through the channels. The channels corresponding to the first to third spacers 221 to 222 will be called a first spacer channel 221a, a second spacer channel 222a and a third spacer channel 223a, respectively. A plurality of the first spacer channels 221a, the second spacer channels 222a and the third spacer channels 223a may be provided.

In addition, the battery module 10 according to another embodiment of the present disclosure may further include a first cooling pipe 250 installed at the front of the first spacer 221 and a second cooling pipe 260 installed at the rear of the second spacer 222.

The first cooling pipe 250 is provided to individually connect the hole region 213 formed at one end of the first side 211 to the plurality of first spacer channels 221a exposed at the front side of the first spacer 221. In this case, the cooling medium may flow into the first empty space S1 through the first spacer channels 221a via the supply tube 230, the hole region 213 and the first cooling pipe 250.

The second cooling pipe 260 is provided to individually connect the hole region 213 formed at the other end of the first side 211 to the plurality of second spacer channels 222a exposed at the rear of the second spacer 222. In this case, the cooling medium may pass through the second spacer channel 222a in the second empty space S2 and be discharged to the outside through the discharge tube 240 via the second cooling pipe 260 and the hole region 213.

The third spacer 223 may be provided to have third spacer channels 223a formed through the inside of the third spacer 223 so that the cooling medium flowing into the first empty space S1 through the first spacer channel 221a is sent toward the second spacer 222.

Thus, if the flow of the cooling medium of the battery module 10 according to this embodiment is summarized, the cooling medium may be discharged out of the battery module 10 by moving in the order of the supply tube 230, the front side of the hole region 213, the first cooling pipe 250, the first spacer channels 221a, the first empty space S1, the third spacer channels 223a, the second empty space S2, the second spacer channels 222a, the second cooling pipe 260, the rear side of the rear hole region 213, and the discharge tube 240.

In this embodiment, since the cooling medium may pass without bypassing the third spacer 223, the hole region 213 may not be provided in the second side 212 of the base plate 210, unlike the former embodiment. Also, the hole region 213 may be formed relatively short as a connection path of the supply tube 230 and the first cooling pipe 250 or of the second cooling pipe 260 and the discharge tube 240.

As described above, in the battery module 10 according to the present disclosure, the spacer 220 is partially applied between the cell stack 100 and the base plate 210, and the cooling medium is supplied into the empty spaces S1, S2 formed between the cell stack 100 and the base plate 210 so that the cell stack 100 may be brought into direct contact with the cooling medium, thereby maximizing the cooling efficiency.

Also, the battery module 10 according to the present disclosure has a function with an improved sealing property to solve the leakage of the cooling medium, which may occur when a liquid cooling medium such as a cooling water and an insulating oil is in direct contact with the battery cell 110, thereby enhancing the reliability of the product.

In addition, a battery pack according to an embodiment of the present disclosure, which is implemented by electrically connecting plurality of the battery modules 10 described above, and a vehicle having the battery pack may also exhibit excellent performance since they have the above advantages of the battery module 10.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or an object to be observed.

What is claimed is:

1. A battery module, comprising:
a cell stack defined by a stack of a plurality of battery cells, the battery cells in the cell stack collectively defining a lower surface of the cell stack; and
a module housing configured to accommodate the cell stack, the module housing having a lower housing, a pair of side housings, a front housing, a rear housing, and an upper housing, for respectively covering a lower portion, a left and right side portion, a front portion, a rear portion, and an upper portion of the cell stack,
wherein the lower housing includes:
a base plate configured to cover an entire lower surface of the cell stack, the base plate having a planar surface and first and second side walls projecting upwardly from the planar surface in a height dimension, the first and second side walls extending parallel to one another along a longitudinal dimension and being positioned on opposite sides of the base plate in a width dimension, the width dimension being orthogonal to the longitudinal dimension; and
a plurality of spacers positioned on the planar surface of the base plate and elongated so as to extend across the base plate in the width dimension, each of the plurality of spacers having opposing first and second ends in the width dimension in contact with the respective first and second side walls, the plurality of spacers being disposed at predetermined intervals along the longitudinal dimension of the base plate so as to define respective empty spaces therebetween, the plurality of spacers being configured to support the cell stack so as to space the cell stack away from the planar surface of the base plate, such that each of the empty spaces is defined: between the lower surface of the cell stack and the planar surface of the base plate in the height dimension, between the first and second side walls in the width dimension, and between two successive ones of the plurality of spacers in the longitudinal dimension; wherein the plurality of spacers includes a first spacer, a second spacer, and a third spacer, with a first one of the empty spaces being defined between the first spacer and the second spacer, and with a second one of the empty spaces being defined between the second spacer and the third spacer,
wherein the first side wall defines a first channel therein extending along the longitudinal dimension, and wherein the second side wall defines a second channel therein extending along the longitudinal dimension, the first channel having an upstream end in communication with an inlet and a downstream end in communication with the first empty space via a first opening through the first side wall in the width dimension, and the second channel having an upstream end in communication with the first empty space via a second opening through the second side wall in the width dimension and having a downstream end in communication with the second empty space via a third opening through the second side wall in the width dimension, whereby a cooling liquid can be supplied from the inlet to the second empty space via a flow path passing sequentially through the first channel, the first opening, the first empty space, the second opening, the second channel, and the third opening, and wherein the cooling liquid in the first and second empty spaces comes into direct contact with the battery cells via the lower surface of the cell stack exposed to the first and second empty spaces.

2. The battery module according to claim 1,
wherein the first and second side walls each having a coupling groove for engaging a coupling protrusion protruding downwardly in the height dimension from a lower end of the respective side housing.

3. The battery module according to claim 2,
wherein the first and second side walls each include a leakage prevention protrusion protruding towards the cell stack and coming into contact with a respective outermost cell of the cell stack.

4. The battery module according to claim 1,
wherein an adhesive is interposed between the cell stack and each of the plurality of spacers to prevent the cooling liquid from leaking between the cell stack and the spacers.

5. The battery module according to claim 1, wherein the first side wall defines a third channel therein extending along the longitudinal dimension, the third channel having a downstream end in communication with an outlet and an upstream end in communication with the second empty space via a fourth opening through the first side wall in the width dimension.

6. A battery pack, comprising a plurality of battery modules according to claim 1 connected together.

7. A vehicle, comprising the battery pack defined in claim 6.

8. The battery module according to claim 5, further comprising:
a discharge tube connected to the downstream end of the third channel, so that the cooling liquid can flow out of the empty spaces.

9. The battery module according to claim 1, wherein a seal is positioned between each of the battery cells of the cell stack such that the cooling liquid in direct contact with the lower surface of the cell stack is prevented from penetrating into any space between the battery cells.

10. The battery module according to claim 1, wherein the inlet includes an inlet opening connected to a supply tube, the inlet opening extending through a face of the first side wall, the face extending transverse to the planar surface of the base plate so that the inlet opening extends through the face in the longitudinal dimension, and the first opening being spaced apart from the inlet opening along the longitudinal dimension.

11. A battery module, comprising:
a cell stack defined by a stack of a plurality of battery cells; and
a module housing configured to accommodate the cell stack, the module housing having a lower housing, a pair of side housings, a front housing, a rear housing, and an upper housing, for respectively covering a lower portion, a left and right side portion, a front portion, a rear portion, and an upper portion of the cell stack;
wherein the lower housing includes:
a base plate configured to cover an entire lower surface of the cell stack, the base plate having a planar surface and first and second side walls projecting upwardly from the planar surface in a height dimension, the first and second side walls extending parallel to one another along a longitudinal dimension and being positioned on opposite sides of the base plate in a width dimension, the width dimension being orthogonal to the longitudinal dimension; and
a plurality of spacers positioned on the planar surface of the base plate and elongated so as to extend across the base plate in the width dimension, each of the plurality of spacers having opposing first and second ends in the width dimension in contact with the respective first and second side walls, the plurality of spacers being disposed at predetermined intervals along the longitudinal dimension of the base plate so as to define respective empty spaces therebetween, the plurality of spacers being configured to support the cell stack so as to space the cell stack away from the planar surface of the base plate, such that each of the empty spaces is defined: between the cell stack and the planar surface of the base plate in the height dimension, between the first and second side walls in the width dimension, and between two successive ones of the plurality of spacers in the longitudinal dimension; wherein the plurality of spacers includes a first spacer, a second spacer, and a third spacer, with a first one of the empty spaces being defined between the first spacer and the second spacer, and with a second one of the empty spaces being defined between the second spacer and the third spacer,
wherein the first side wall defines a first channel and a third channel therein extending along the longitudinal dimension, and wherein the second side wall defines a second channel therein extending along the longitudinal dimension, the first channel having an upstream end in communication with an inlet and a downstream end in communication with the first empty space via a first opening through the first side wall in the width dimension, the second channel having an upstream end in communication with the first empty space via a second opening through the second side wall in the width dimension and having a downstream end in communication with the second empty space via a third opening through the second side wall in the width dimension, and the third channel having a downstream end in communication with an outlet and an upstream end in communication with the second empty space via a fourth opening through the first side wall in the width dimension,
further comprising a supply tube connected to the upstream end of the first channel and a discharge tube connected to the downstream end of the third channel, so that a cooling medium can flow into or out of the empty spaces,
wherein the battery cells in the cell stack collectively define a lower surface of the cell stack, and wherein the cooling medium in the first and second empty spaces comes into direct contact with the battery cells via the lower surface of the cell stack exposed to the first and second empty spaces.

12. The battery module according to claim 11,
wherein the first and second side walls each having a coupling groove for engaging a coupling protrusion protruding downwardly in the height dimension from a lower end of the respective side housing.

13. The battery module according to claim 12,
wherein the first and second side walls each include a leakage prevention protrusion protruding towards the cell stack and coming into contact with a respective outermost cell of the cell stack.

14. The battery module according to claim 11, wherein an adhesive is interposed between the cell stack and each of the plurality of spacers to prevent the cooling medium from leaking between the cell stack and the spacers.

15. The battery module according to claim 11, wherein a seal is positioned between each of the battery cells of the cell stack such that the cooling medium in direct contact with the lower surface of the cell stack is prevented from penetrating into any space between the battery cells.

16. A battery pack, comprising a plurality of battery modules according to claim 11 connected together.

17. A vehicle, comprising the battery pack defined in claim 16.

* * * * *